United States Patent Office 2,771,475
Patented Nov. 20, 1956

2,771,475
STEROIDS

John A. Hogg, Kalamazoo Township, Kalamazoo County, Philip F. Beal, Portage Township, Kalamazoo County, and Alan H. Nathan and Frank H. Lincoln, Jr., Kalamazoo Township, Kalamazoo County, Mich., assignors to The Upjohn Company, Kalamazoo, Mich., a corporation of Michigan No Drawing. Application December 17, 1954,
Serial No. 476,057

3 Claims. (Cl. 260—397.1)

This invention relates to novel lower-alkyl 3-keto-4,9(11),17(20)-pregnatriene-21-oates. This application is a continuation-in-part of the copending application S. N. 346,274, filed April 1, 1953.

It is an object of the present invention to provide the novel lower-alkyl 3-keto-4,9(11),17(20)-pregnatriene-21-oates. Other objects will be apparent to those skilled in the art to which this invention pertains.

The novel compounds of the present invention are useful in the production of known and physiologically active steroids, including 9(11)-dehydrohydrocortisone acetate and 9α-fluorohydrocortisone acetate. The novel compounds and a method for their production may be illustrated as follows:

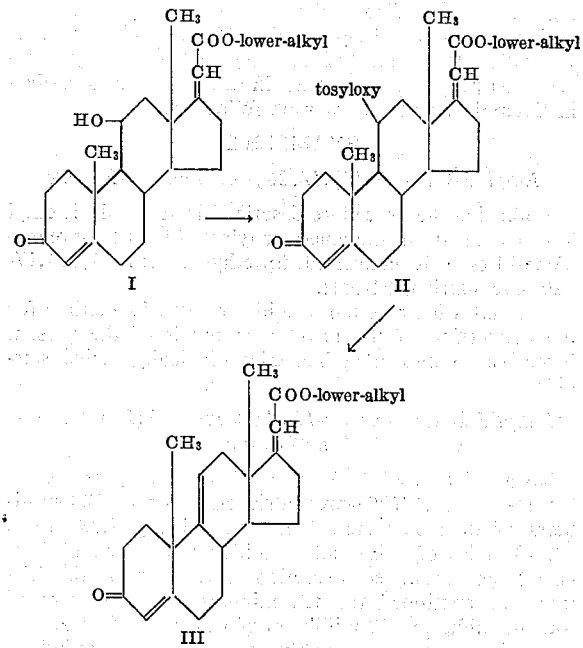

Esterifying a lower-alkyl 3-keto-11α-hydroxy-4,17(20)-pregnadiene-21-oate (I), claimed in the copending application of Hogg et al., S. N. 319,173, filed November 6, 1952, with paratoluenesulfonyl chloride is productive of a lower alkyl 3-keto-11α-tosoyloxy-4,17(20)-pregnadiene-21-oate (II), claimed in the copending application of Jackson et al., S. N. 476,060 (Case 820). Detosylation of this compound in refluxing collidine is productive of the lower-alkyl 3-keto-4,9(11),17(20)-pregnatriene-21-oates (III), of the present invention. The preparation of the novel compounds of the present invention is disclosed more fully in the preparations hereinafter.

Ketalization of a lower-alkyl 3-keto-4,9(11),17(20)-pregnatriene-21-oate of the present invention with ethylene glycol is productive of the corresponding 3-ethylene glycol ketal which, when reduced with lithium aluminum hydride in ether, is converted to the 3-ethylene glycol ketal of 21-hydroxy-4,9(11),17(20)-pregnatriene-3-one. Hydrolysis of the 3-ethylene glycol ketal in aqueous acetone containing hydrochloric acid to regenerate the 3-keto group followed by acetylation of the 21-hydroxy group with acetic anhydride is productive of 21-acetoxy-4,9(11),17(20)-pregnatriene-3-one. Oxidative hydroxylation of this compound with hydrogen peroxide in the presence of a catalytic amount of osmium tetroxide is productive of the known 17α-hydroxy-21-acetoxy-4,9(11)-pregnadiene-3,20-dione which can be converted to the phsiologically active 9α-fluorohydrocortisone acetate by known methods.

Alternatively, the lower-alkyl 3-keto-4,9(11),17(20)-pregnatriene-21-oates of the present invention can be reacted with N-bromoacetamide, in the presence of a mineral acid and water, to produce hydrobromous acid which adds to the 9(11)-double bond to produce a lower-alkyl 3 - keto - 9α - bromo-11β-hydroxy-4,17(20)-pregnadiene-21-oate. Reaction of this compound with potassium acetate in methanol is productive of a lower-alkyl 3-keto-9:11-β-oxido-4,17(20)-pregnadiene-21-oate which is converted, with hydrogen fluoride in chloroform, to a lower-alkyl 3-keto-9α-fluoro-11β-hydroxy-4,17(20)-pregnadiene-21-oate. Ketalization of the 3-keto group of this compound with ethylene glycol followed by reduction of the 21-carboxylic acid ester group with lithium aluminum hydride in ether is productive of the 3-ethylene glycol ketal of 9α-fluoro-11β,21-dihydroxy-4,17(20)1pregnadiene-3-one. Hydrolysis of the 3-ethylene glycol ketal group with hydrochloric acid in aqueous acetone followed by acetylation of the 21-hydroxy group with acetic anhydride is productive of 9α-fluoro-11β-hydroxy-21-acetoxy,4,17(20)-pregnadiene-3-one which is converted, by oxidative hydroxylation with N-methyl morpholine oxide peroxide in the presence of a catalytic amount of osmium tetroxide, to the known 9α-fluorohydrocortisone acetate.

The novel compounds of the present invention include those represented by Formula III wherein the lower-alkyl group is, for example, methyl, ethyl, propyl, isopropyl, butyl, isobutyl, amyl, 2-methylbutyl, 3-methylbutyl, hexyl, heptyl, or octyl, preferably methyl or ethyl.

The following examples and preparations are illustrative of the products of the present invention, and a process for their production and use, but are not to be construed as limiting.

PREPARATION 1.—METHYL 3-KETO-11α-HYDROXY-4,17(20)-PREGNADIENE-21-OATE

To a stirred solution of 22.60 grams (0.05 mole) of the sodium enolate of 11α-hydroxy-21-ethoxyoxalyl-progesterone (U. S. 2,683,724) in 550 milliliters of methanol was added dropwise sixteen grams (0.1 mole) of bromine. To the resulting solution of 29.4 grams (0.05 mole) of 11α-hydroxy-21,21-dibromo-21-ethoxy-oxalylprogesterone was added a solution of 16.5 grams (0.3 mole) of sodium methoxide in 500 milliliters of methanol. The reaction mixture was maintained at about 25 degrees centigrade for sixteen hours whereafter an equal volume of water was added thereto and the whole was extracted with about equal portions of first benzene and then two portions of methylene chloride. The combined extracts were dried with anhydrous sodium sulfate and thereafter distilled to remove the solvent therefrom. The distillation residue was dissolved in 500 milliliters of methylene chloride and chromatographed over 875 grams of Florisil synthetic magnesium silicate. The column was developed with 1,250-milliliter portions of solvents of the following composition and order: four of methylene chloride plus five percent acetone, four of methylene chloride plus ten percent acetone, four of methlene chloride plus fifteen percent acetone, two of methylene chloride plus twenty percent acetone, and finally, two of acetone. The methylene chloride plus ten percent acetone eluates and the first methylene chloride plus fifteen percent acetone eluate were combined and the solvent distilled therefrom. The seven grams of distillation residue was recrystallized from a mixture of ethyl acetate and Skellysolve B hexane hydrocarbons to yield crystalline methyl 3-keto-11α-hydroxy-4,17(20)-pregnadiene-21-oate melting at 205 to 210 degrees centigrade.

Analysis:
Calculated for $C_{22}H_{30}O_4$: C, 73.75; H, 8.48
Found: C, 73.77; H, 8.38
C, 74.10; H, 8.59

Similarly, other lower-alkyl 3-keto-11α-hydroxy-4,17(20)-pregnadiene-21-oate acid esters are prepared wherein the lower-alkyl group is methyl, propyl, butyl, amyl, hexyl, heptyl, octyl, or the like, by replacing the sodium methoxide in methanol used in the above-described reaction by the corresponding alkali-metal alkoxide in an alkanol.

Alternatively, the thus-produced methyl 3-keto-11α-hydroxy-4,17(20)-pregnadiene-21-oate can be saponified to produce the free acid which can then be reesterified, according to known methods, with the selected esterifying agent to produce the desired lower-alkyl 3-keto-11α-hydroxy-4,17(20)-pregnadiene-21-oate.

PREPARATION 2.—METHYL 3-KETO-11α-(P-TOLUENESULFONYLOXY)-4,17(20)-PREGNADIENE-21-OATE

A mixture of one gram of methyl 3-keto-11α-hydroxy-4,17(20)-pregnadiene-21-oate, one gram of para-toluenesulfonyl chloride and five milliliters of pyridine was maintained at about 25 degrees centigrade for 72 hours. The mixture was then poured into 100 milliliters of cracked ice and water and the precipitated product separated from the aqueous phase by filtration. The precipitate was dissolved in 75 milliliters of chloroform and the solution washed with fifty milliliters of water. The chloroform solution was then dried over anhydrous sodium sulfate and the chloroform then evaporated. The residue was dissolved in 25 milliliters of chloroform and poured over a chromatographic column of 75 grams of Florisil synthetic magnesium silicate. The column was developed with 100-milliliter portions of solvents of the following composition and order: Three of Skellysolve B hexane hydrocarbons plus five percent acetone. Three of Skellysolve B plus ten percent acetone. Three of Skellysolve B plus twenty percent acetone. Three of Skellysolve B plus thirty percent acetone and two of acetone. The Skellysolve B plus thirty percent acetone eluted 1.262 grams, a yield of 88.5 percent of the theoretical, of methyl 3-keto-11α-(para-toluenesulfonyloxy)-4,17(20)-pregnadiene-21-oate which, after crystallization from a mixture of 25 milliliters of hot acetone and 75 milliliters of Skellysolve B, weighed 1.03 grams, melted at 149 to 153 degrees centigrade, had an optical rotation, $[\alpha]_D$ of plus seventy degrees in acetone and the analysis below.

Calculated for $C_{29}H_{36}O_6S$: C, 67.96; H, 7.08; S, 6.25.
Found: C, 68.08; H, 7.54; S, 6.25.

Similarly, other 3-keto-11α-(para-toluenesulfonyloxy)-4,17(20)-pregnadiene-21-oates are prepared by substituting other esters of 3-keto-11α-hydroxy-4,17(20)-pregnadiene-20-oic acid in the esterification reaction with para-toluenesulfonyl chloride, e. g., alkyl esters and preferably lower-alkyl esters, for example, the ethyl, propyl, butyl, amyl, hexyl, heptyl, or ester.

EXAMPLE 1

Methyl 3-keto-4,9(11),17(20)-pregnatriene-21-oate

A solution of 500 milligrams of methyl 3-keto-11α-(para - toluenesulfonyloxy) - 4,17(20) - pregnadiene-21-oate in ten milliliters of collidine was refluxed at 172 degrees centigrade for thirty minutes. The reaction mixture was then cooled to room temperature and mixed with 100 milliliters of diethyl ether. The collidine was removed from the ether by washing with cold five percent hydrochloric acid. The ether layer was then dried over anhydrous sodium sulfate, filtered and the ether then distilled. There was thus obtained 0.316 gram of methyl 3-keto - 4,9(11),17(20) - pregnatriene-21-oate which, after crystallization from a mixture of acetone and Skellysolve B, weighed 0.31 gram, a yield of 93.5 percent of the theoretical, melted at 165 to 170 degrees centigrade and had the analysis below.

Calculated for $C_{22}H_{28}O_3$: C, 77.61; H, 8.28. Found: C. 77.58; H, 8.19.

Following the procedure described in Example 1, methyl 3-keto-4,9(11),17(20)-pregnatriene-21-oate can be prepared by the reaction of methyl 3-keto-11α-(para-toulenesulfonyloxy) - 4,17(20)-pregnadiene-21-oate with sodium acetate in boiling glacial acetic acid, refluxing methanol, or absolute ethanol, five percent ethanolic potassium hydroxide, or potassium acetate in boiling aqueous acetone, sodium formate in refluxing methanol, or similar reagent.

Similarly, substituting another 11α-sulfonyloxy ester of methyl 3 - keto - 11α - hydroxy-4,17(20)-pregnadiene-21-oate, for example, the benzenesulfonate, the 2,4,6-trimethylbenzenesulfonate, the p-phenylbenzenesulfonate, methylsulfonate, etc., there is also produced methyl 3-keto-4,9(11),17(20)-pregnatriene-21-oate.

Other esters of 3-keto-4,9(11),17(20)-pregnatriene-21-oic acid wherein the ester group is, for example, aralkyl, alkaryl, or preferably lower-alkyl, e. g., ethyl, propyl, butyl, amyl, hexyl, heptyl, octyl, are prepared by substituting the corresponding esters of 3-keto-11α-(para-toluenesulfonyloxy)-4,17(20)-pregnadiene-21-oic acid or other 11α-sulfonyloxy ester of an alkyl 3-keto-11α-hydroxy-4,17(20)-pregnadiene-21-oate in the reaction described in Example 1 or the paragraph following.

EXAMPLE 2

Ethyl 3-keto-4,9(11),17(20)-pregnatriene-21-oate

Following the procedure described in Example 1, ethyl 3 - keto-11α-(para-toluenesulfonyloxy)-4,17(20)-pregnadiene-21-oate is converted to ethyl 3-keto-4,9(11),17-(20)-pregnatriene-21-oate.

The following reactions are illustrative of a method for the conversion of the novel compounds of the present invention to known and/or physiologically active steroids.

Methyl 3-keto-9α-bromo-11β-hydroxy-4,17(20)-pregnadiene-21-oate

To a solution of 3.40 grams (0.010 mole) of methyl 3-keto-4,9(11),17(20)-pregnatriene-21-oate in 120 milliliters of dioxane were added with stirring 1.78 grams (0.013 mole) of N-bromoacetamide and twenty milliliters of a 25 percent aqueous solution of perchloric acid. Stirring was continued for ten minutes and one gram of sodium sulfite in 300 milliliters of water was then added. The mixture was thoroughly extracted with methylene chloride and the methylene chloride extract was washed successively with cold aqueous sodium bicarbonate and water, dried with anhydrous sodium sulfate and the methylene chloride then distilled at reduced pressure. The residue was dissolved in benzene and poured over a chromatographic column of 175 grams of Florisil synthetic magnesium silicate. The column was developed with 300-milliliter proportions of solvents of the following composition and order: Nine of Skellysolve B hexane hydrocarbons plus five percent acetone, seven of Skellysolve B plus 7.5 percent acetone, five of Skellysolve B plus ten percent acetone and one of acetone. The Skellysolve B plus 7.5 percent acetone eluate contained the methyl 3 - keto-9α-bromo-11β-hydroxy-4,17(20)-pregnadiene-21-oate which, after crystallization from a mixture of acetone and Skellysolve B, weighed 2.53 grams, a yield of 58 percent of the theoretical, and melted at 105 to 108 degrees centigrade. Recrystallization of this product from the same solvent mixture raised the melting point to 108 to 109 degrees centigrade (decomposition). Infrared spectrum analysis was consistent with the structure.

*Methyl 3-keto-9:11-β-oxido-4,17(20)-pregnadiene-21-oate*

A mixture of 2.53 grams (5.78 millimoles) of methyl 3 - keto-9α-bromo-11β-hydroxy-4,17(20)-pregnadiene-21-oate, three grams of anhydrous potassium acetate and 100 milliliters of absolute methanol was heated at the refluxing temperature of the mixture for 2.5 hours. The cooled solution was then diluted with two volumes of water and extracted thoroughly with methylene chloride. The methylene chloride extract was dried and then the solvent evaporated therefrom at reduced pressure. The residue was dissolved in benzene and then poured over a chromatographic column of 100 grams of Florisil synthetic magnesium silicate. The column was developed with 200-milliliter portions of solvents of the following composition and order: Nine of Skellysolve B plus five percent acetone, five of Skellysolve B plus 7.5 percent acetone, five of Skellysolve B plus ten percent acetone, and one of acetone. The Skellysolve B plus five percent acetone eluates contained 1.24 grams, a yield of 54 percent of the theoretical, of methyl 3-keto-9:11-β-oxido-4,17(20)-pregnadiene - 21 - oate which, after crystallization from Skellysolve B containing a trace of acetone, yielded heavy needles melting at 123.5 to 125 degrees centigrade and having an optical rotation $[\alpha]_D$ in chloroform of plus 48 degrees and the analysis below.

Calculated for $C_{22}H_{28}O_4$: C, 74.13; H, 7.92. Found: C, 74.33; H, 7.83.

*Methyl 3-keto-9α-fluoro-11β-hydroxy-4,17(20)-pregnadiene-21-oate*

A solution of four grams (1.12 millimoles) of methyl 3-keto-9:11-β-oxido-4,17(20)-pregnadiene-21-oate in fifty milliliters of alcohol-free chloroform was cooled to zero degrees centigrade. To the cooled solution was added 25 milliliters of a cold solution of anhydrous hydrogen fluoride in alcohol-free chloroform whereupon a red color developed. The solution was stored at minus fifteen degrees centigrade for four hours with occasional stirring. The solution was then washed with aqueous sodium bicarbonate and then with water. The washed chloroform solution was dried and then distilled to dryness. The partially crystalline residue was dissolved in benzene and poured over a column of 200 grams of Florisil synthetic magnesium silicate. The column was developed with 200-milliliter portions of solvents of the following composition and order: Ten of Skellysolve B plus five percent acetone, five of Skellysolve B plus 7.5 percent acetone, five of Skellysolve B plus ten percent acetone, and one of acetone. The Skellysolve B plus 7.5 percent acetone eluates contained the methyl 3-keto-9α-fluoro-11β-hydroxy-4,17(20)-pregnadiene-21-oate, which, after crystallization from a mixture of acetone and Skellysolve B, melted at 245 to 247 degrees centigrade, had an infrared spectrum absorption consistent with the structure and the analysis below. The Skellysolve B plus five percent acetone eluates contained 1.40 grams of starting steroid.

Calculated for $C_{22}H_{29}FO_4$: C, 70.19; H, 7.76; F, 5.05. Found: C, 70.28; H, 7.71; F, 4.86.

*The 3-ethylene glycol ketal of methyl 3-keto-9α-fluoro-11β-hydroxy-4,17(20)-pregnadiene-21-oate*

A mixture of 430 milligrams (1.4 millimoles) of methyl 3 - keto-9α-fluoro-11β-hydroxy-4,17(20)-pregnadiene-21-oate, three milliliters of ethylene glycol, 100 milligrams of para-toluenesulfonic acid monohydrate and fifty milliliters of anhydrous benzene was heated at the refluxing temperature of the mixture for six hours with concomitant and continuous removal of the water of reaction with a Dean-Stark water trap. The mixture was then cooled, washed with aqueous sodium bicarbonate and then with water, and distilled at reduced pressure to dryness. The crude crystalline residue consisted essentially of the 3-ethylene glycol ketal of methyl 3-keto-9α-fluoro-11β-hydroxy-4,17(20)-pregnadiene-21-oate.

*The 3-ethylene glycol ketal of 9α-fluoro-11β,21-dihydroxy-4,17-pregnadiene-3-one*

The crude crystalline ketal obtained above was dissolved in 25 milliliters of benzene and then added dropwise to a stirred suspension of 0.5 gram of lithium aluminum hydride and fifty milliliters of ether. After the addition of the benzene solution was completed, the stirring was continued for 1.5 hours. The excess lithium aluminum hydride in reaction mixture was then decomposed by the dropwise addition of five milliliters of ethyl acetate. Ten milliliters of water was then slowly added to the mixture followed by 25 milliliters of a solution of five milliliters of concentrated hydrochloric acid and twenty milliliters of water. The benzene layer was separated and washed with an aqueous solution of sodium bicarbonate followed by water. The benzene solution was then dried and distilled to dryness to leave a distillation residue consisting essentially of the 3-ethylene glycol ketal of 9α - fluoro-11β,21-dihydroxy-4,17(20)-pregnadiene-3-one.

*9α-fluoro-11β,21 dihydroxy-4,17(20)-pregnadiene-3-one*

The crude 3-ethylene glycol ketal of 9α-fluoro-11β,21-dihydroxy-4,17(20)-pregnadiene-3-one, obtained from the distillation residue above was dissolved in 35 milliliters of acetone. To the solution was added 5 milliliters of a 1.0 N solution of sulfuric acid and the acidic mixture maintained with stirring at about 25 degrees centigrade for six hours. Water was then added to the mixture. The aqueous mixture was extracted with methylene chloride and the methylene chloride extract then washed with aqueous sodium bicarbonate followed by water. The extract was dried and the solvent distilled at reduced pressure. The residue was dissolved in a mixture of benzene and methylene chloride and poured over a chromatographic column of fifty grams of Florisil synthetic magnesium silicate. The column was developed with 100-milliliter portions of solvent of the following composition and order: five of Skellysolve B plus 7.5 percent acetone, seven of Skellysolve B plus ten percent acetone, five of Skellysolve B plus fifteen percent acetone, five of Skellysolve B plus twenty percent acetone and one of acetone. The Skellysolve B plus fifteen percent acetone eluates contained 190 milligrams of product. Trituration of a portion of this product with ether followed by crystallization from a mixture of ethyl acetate and ether gave fine needles of 9α-fluoro-11β,21-dihydroxy-4,17(20)-pregnadiene-3-one melting at 202.5 to 204 degrees centigrade and having the analysis below:

Calculated for $C_{21}H_{29}FO_3$: F, 5.45. Found: F, 5.67, 5.55.

*9α-fluoro-11β-hydroxy-21-acetoxy-4,17(20)-pregnadiene-3-one*

Crude 9α-fluoro - 11β,21 - dihydroxy - 4,17(20) - pregnadiene-3-one, obtained from the chromatographic column described above, was dissolved in a mixture of five milliliters of acetic anhydride and five milliliters of pyridine. The solution was maintained at about 25 degrees centigrade for about sixteen hours and then poured into a mixture of ice and water. The gummy precipitate was extracted with methylene chloride and the extract then washed successively with ice cold dilute aqueous hydrochloric acid, cold aqueous sodium bicarbonate and finally with cold water. The methylene chloride solution, after drying, was poured over a chromatographic colum of 75 grams of Florisil synthetic magnesium silicate. The column was developed with 150-milliliter portions of the following composition and order: five of Skellysolve B plus five percent acetone, eight of Skellysolve B plus 7.5 percent acetone, five of Skellysolve B plus ten percent acetone and one of acetone. The Skellysolve B plus 7.5 percent acetone eluates contained 9α-fluoro-11β-hydroxy-21-acetoxy-4,17(20)-pregnadiene-3-one, a portion of which, after crystallization from a mixture of acetone and Skellysolve B, melted at 205 to 207.5 degrees centigrade and had the analysis below.

Calculated for $C_{23}H_{31}FO_4$: F, 4.87. Found: F, 4.24.

*9α-fluoro-11β,17α-dihydroxy-21-acetoxy-4-pregnene-3,20-dione*

Approximately 125 milligrams of impure 9α-fluoro-11-β-hydroxy-21-acetoxy-4,17(20)-pregnadiene-3-one, obtained from the chromatographic column described above, was dissolved in eight milliliters of dry tertiary butyl alcohol containing one milliliter of dry pyridine. The solution was mixed at room temperature with stirring with 0.6 milliliter of a solution of 0.125 N solution of N-methylmorpholineoxide peroxide prepared by the reaction of N-methylmorpholine with two molar equivalents of anhydrous hydrogen peroxide, in dry tertiary butyl alcohol. To this mixture was added five milligrams osmium tetroxide and the solution stirred for 4.5 hours at about 25 degrees centigrade. Aqueous sodium sulfite was then added and the mixture extracted with methylene chloride. The extract was washed with water, dried and the solvent distilled. The distillation residue was dissolved in benzene and poured over a chromatogarphed column of fifteen grams of Florisil synthetic magnesium silicate. The column was developed with 50-milliliter portions of solvents of the following composition and order: five of Skellysolve B plus 7.5 percent acetone, five of Skellysolve B plus ten percent acetone, five of Skellysolve B plus fifteen percent acetone, three of Skellysolve B plus twenty percent acetone, and one of acetone. The Skellysolve B plus fifteen percent acetone eluates were distilled to dryness leaving 47 milligrams of 9α-fluoro-11β,17α-dihydroxy-21-acetoxy-4-pregnene-3,20-dione (9α-fluorohydrocortisone acetate) melting at 195 to 200 degrees centigrade.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. Lower-alkyl 3-keto-4,9(11),17(20)-pregnatriene-21-oate having the formula:

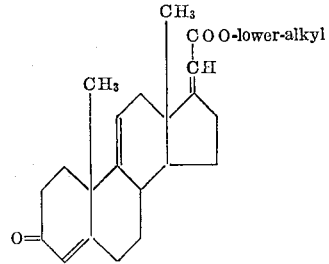

2. Methyl 3-keto-4,9(11),17(20)-pregnatriene-21-oate.
3. Ethyl 3-keto-4,9(11),17(20)-pregnatriene-21-oate.

References Cited in the file of this patent

UNITED STATES PATENTS

| | | |
|---|---|---|
| Re. 22,941 | Reichstein | Nov. 25, 1947 |
| 2,695,906 | Hogg | Nov. 30, 1954 |